No. 844,221.  
PATENTED FEB. 12, 1907.  
W. S. WHITE.  
FLUSHING VALVE.  
APPLICATION FILED SEPT. 11, 1905.  
2 SHEETS—SHEET 1.
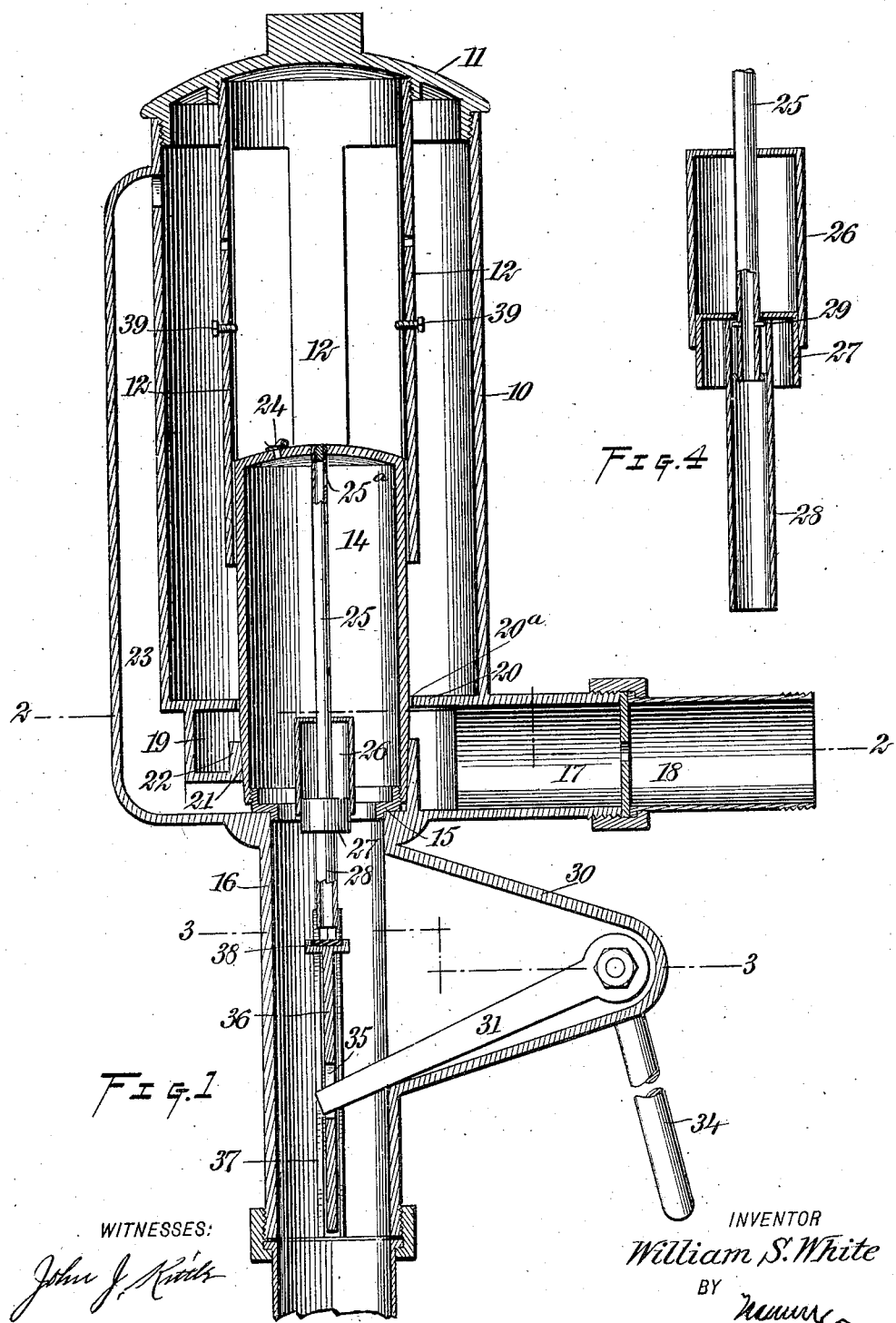
WITNESSES:  
INVENTOR  
William S. White  
BY  
ATTORNEYS

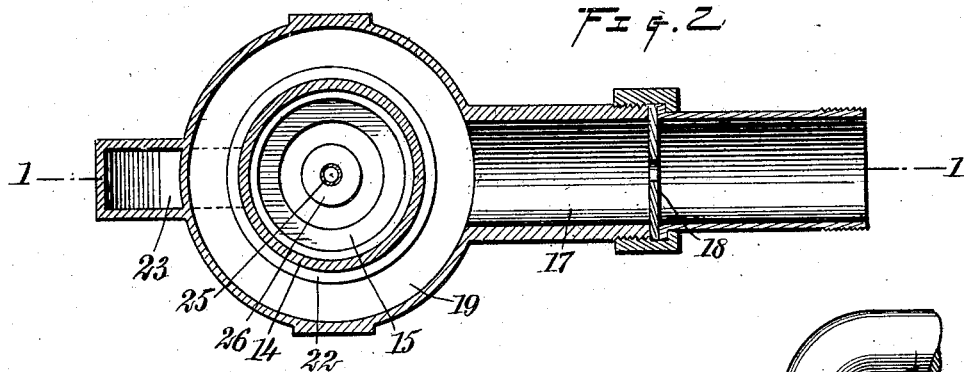
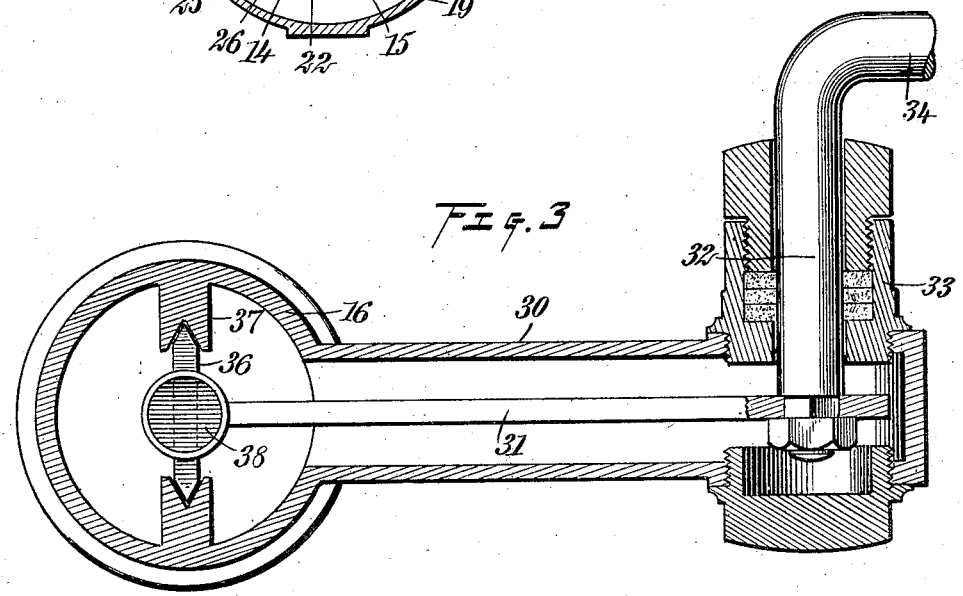
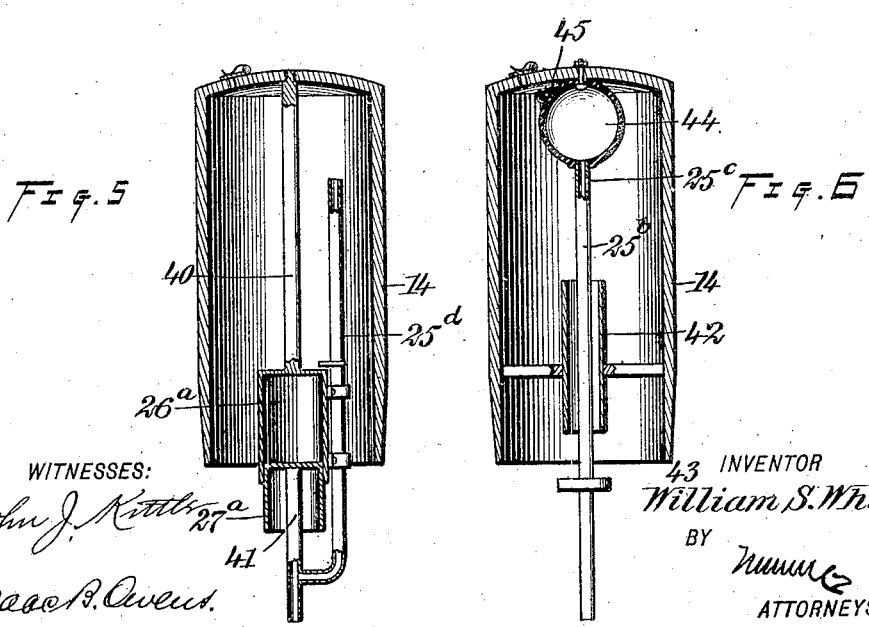

UNITED STATES PATENT OFFICE.

WILLIAM S. WHITE, OF DENVER, COLORADO.

FLUSHING-VALVE.

No. 844,221.  Specification of Letters Patent.  Patented Feb. 12, 1907.

Application filed September 11, 1905. Serial No. 278,047.

*To all whom it may concern:*

Be it known that I, WILLIAM S. WHITE, a citizen of the United States, and a resident of Denver, in the county of Denver and State of Colorado, have invented a new and Improved Flushing-Valve, of which the following is a full, clear, and exact description.

The invention relates to a flushing valve or mechanism which is applicable to various purposes, as will be apparent to persons skilled in the art.

The object of the invention is to provide a mechanism which will be certain of operation under different conditions and which may be regulated to increase or diminish the flushing period, as may be desired.

The invention resides in certain special features of construction and combinations of parts, which will be fully set forth hereinafter and particularly pointed out in the claims.

Reference is had to the accompanying drawings, which illustrate, as an example, the preferred embodiment of my invention, in which drawings—

Figure 1 is a vertical section on the line 1 1 of Fig. 2. Fig. 2 is a horizontal section on the line 2 2 of Fig. 1. Fig. 3 is a horizontal section on the line 3 3 of Fig. 1. Fig. 4 is a detail section showing the dash-pot or cushion device by which air is exhausted from the float, and Figs. 5 and 6 are respectively sectional views showing modifications in the form of the air-exhausting devices.

Referring to Figs. 1 to 4, 10 indicates the float-reservoir having a cap 11 secured in its upper end. Said cap carries downwardly-projecting guides 12, between which the float 14 is adapted to move. Said float is cylindric in form and has an open lower end provided with a valve-ring 15, which seats in the upper end of the discharge-pipe 16.

17 indicates the supply-pipe, which leads from any suitable source of water-supply and in which, if desired, a disk or partition 18 may be removably placed. Said disk is perforated, and by varying the size of the perforations the volume of water flowing through the pipe 17 may be regulated at will. The pipe 17 communicates directly with an annular chamber 19, which is formed at the lower end of the float-reservoir 10. The bottom 20 of the float-reservoir has an opening 20ª therein, which communicates with the chamber 19, and the bottom of the chamber has an opening 21 therein, which is surrounded by an annular flange or seat 22. The inner walls of said flange or seat 22 are slightly tapered to correspond to the tapered lower portion of the float 10, which when the float is in the positions shown in Fig. 1 is adapted to seat firmly within the flange. The opening 21 places the chamber 19 in communication with the discharge-pipe 16, and leading into said opening is a passage 23, which extends from the upper part of the float-reservoir 10. When the float-valve 14 is seated, as shown in Fig. 1, the opening 20ª is nearly closed. This opening 20ª is never completely sealed, and as the float is raised its tapered lower end gradually increases the size of the space between the float-valve and the edge of the opening.

If desired, the float 14 may be provided in its top with a vent controlled by an automatic valve or check 24, which seats against fluid movement into the float. Fastened to the upper wall of the float 14 is a tubular stem 25, which projects downwardly through the float and is provided at its upper portion with a vent-opening 25ª. At its lower end the stem 25 carries rigidly an inverted cup 26, which is open at its lower end and receives a piston-like member 27, said member being freely movable in the cup. These parts 26 and 27 form a cushion or dash-pot device. A tubular stem 28 is secured to the piston member 27 and slides freely on the lower part of the stem 25. Said stem 25 is provided with pins or equivalent devices 29 which limit the downward movement of the parts 27 and 28. The tubular member or stem 28 projects downward into the discharge-pipe 16, and said discharge-pipe has an offset 30, forming a chamber, in which is arranged a vertically-oscillating arm 31. As shown best in Fig. 3, this arm is fastened to a rocking journal 32, mounted in a suitable stuffing-box 33, supported by the offset 30. The rocking journal 32 is provided with a laterally-disposed handle 34, permitting the manual operation of the journal or shaft 32 and arm 31. Said arm 31 engages at its free portion in an opening 35, formed in a slide 36, which slide moves freely in vertical guides 37, secured in the discharge-pipe 16. The slide 36 is provided at its upper end with a packing disk or gasket 38, and this is adapted to engage the lower end of the tubular stem or member 28, so as to move the same upward, causing the piston member 27 to enter into the upper portion of the inverted cup 26 and finally causing the float 14 to be lifted from its seat.

In the operation of the device when the parts are in position shown in Fig. 1, in which a flow of water from the pipe 17 to the pipe 16 is prevented, the chamber 10 is full of water, together with the passage 23, chamber 19, and supply-pipe 17. Upon operating the handle 34 to raise the arm 31 the slide 36 is moved upward, causing the gasket 38 to engage the lower edge of the stem 28 and sealing the same, thus pushing the piston-like member 27 into the cup or cylinder 26 and raising the float 14 with a cushioned movement, the float moving in the guides upward as far as permitted by stops 39, which are adjustable in the guides. As the upward movement of the float in the chamber 10 displaces part of the water therein this water is permitted to move through the passage 23 out by way of the discharge-pipe 16. This movement of the parts raises the float so that the opening 21 is unobstructed and the water is then free to flow from the pipe 17 through the opening 21 and into the discharge-pipe 16. As the arm 31 returns to its position, as shown in Fig. 1, the slide 36 is also dropped. A partially-hermetic connection between the engaging surfaces of the parts 26 and 27 prevents the immediate return of the tubular stem 28 to its lower position, and for a time said stem is held raised into or partially into the float. As air gradually leaks between said members 26 and 27 the stem 28 drops and projects into the current of water flowing from the pipe 17 into the pipe 16. This exerts a suction through the tubular stems 28 and 25 and into the upper part of the float 14, gradually exhausting the air therefrom and permitting the water to enter the float, replacing the air. Normally the quantity of air in the float is sufficient to cause the float to lie buoyant in the body of water in the reservoir 10; but as the air is withdrawn as above described and water enters the float the buoyant power of the float decreases until it reaches the position shown in Fig. 1, whereupon it cuts off the movement of water into the pipe 16. At this time the water which has entered the float 14 will be drained therefrom and the parts will assume their normal position ready for a second operation.

The precise arrangement of the devices for withdrawing the air from the upper part of the float is in no sense material, and various means may be resorted to for this purpose without departing from the spirit of my invention.

In Figs. 5 and 6 modifications of the arrangement shown in Figs. 1 and 4 are illustrated. Referring to Fig. 5, it will be seen that the cylinder-like member or cup $26^a$ is supported in the float 14 by means of a rod 40, while the piston-like member $27^a$ is connected to the tubular stem $25^d$ by means of a branch or arm 41, the stem $25^d$ extending up into the float and opening into the upper end, as shown. In Fig. 6 the stem $25^b$ is movable through a guide 42 in the lower part of the float 14 and is provided with a stop 43 at its lower portion adapted to engage the guide 42 upon the upward movement of the stem. At the upper end the stem $25^b$ is provided with a vent $25^c$, and it communicates with a rubber or other elastic bulb 44. Said bulb has a vent into the upper part of the float which is commanded by a valve 45, opening from the bulb into the float. In both of these devices (illustrated in Figs. 5 and 6) the object to be attained and the *modus operandi* are essentially the same as that set forth in connection with the structure in Figs. 1 and 2, and the dash-pot and cushion devices serve to permit the return of the stems $25^d$ and $25^b$ after the raising of the float, so that as the stem gradually returns into the current of water passing through the device the action of this water withdraws the air from the upper part of the float, gradually decreasing the buoyancy of the float and gradually permitting it to move into closed position.

It will be seen, therefore, that my invention employs a float-valve which is adapted to be manually raised into open position, so as to permit the water to flow through the device, and which is gradually deprived of its buoyancy, so that the float-valve may in time return to its seat and cut off the water-flow.

It will also be seen that the longer the time taken in returning the valve the longer the period during which the flushing operation continues. This action may be regulated by the screws 39, for example, which limit the upward movement of the float. The said action may also be regulated by controlling the time required in exhausting the air from the upper part of the float. This latter operation may be effected by regulating the dash-pot or cushion device and also by regulating the size of the opening $25^a$ in the upper part of the stem 25.

Having thus described the preferred form of my invention, what I claim as new, and desire to secure by Letters Patent, is—

1. The combination of a reservoir or receptacle having a chamber at the lower end, a water-supply pipe leading to said chamber, a water-outlet pipe communicating with said chamber, a float-valve in said reservoir and controlling the communication between said chamber and the outlet-pipe, means for raising the float-valve, and means for gradually decreasing the buoyancy of the float-valve to permit the gradual descent of the valve to its seat.

2. The combination of a reservoir, a float-valve operating therein, a supply-pipe leading to the lower part of the reservoir, an outlet-pipe communicating with the supply-pipe, such communication being controlled by said float-valve, a tubular stem adapted to withdraw air from the float-valve, for the purpose specified, a cushioning or dash-pot device in connection with said stem, and means adapted to engage the stem for raising the float-valve from its seat.

3. The combination of a reservoir, a float-valve operating therein, a supply-pipe leading to the reservoir, an outlet-pipe communicating with the supply-pipe, such communication being controlled by said float-valve, a tubular stem fastened in the float-valve and communicating at its upper portion with the interior thereof, an inverted cup or cylinder attached to the lower portion of the tubular stem, a piston-like member operating in said cup or cylinder, a tubular stem extension attached to said piston-like member and telescoping over the main tubular stem, and means adapted to engage said tubular stem extension for lifting the float-valve from its seat.

4. The combination of a reservoir, a float-valve operating therein, a supply-pipe leading to the reservoir, an outlet-pipe communicating with the supply-pipe, such communication being controlled by said float-valve, a tubular stem fastened to the float-valve and communicating at its upper portion with the interior thereof, an inverted cup or cylinder attached to the lower portion of the tubular stem, a piston-like member operating in said cup or cylinder, a tubular stem extension attached to said piston-like member and telescoping over the main tubular stem, and means adapted to engage said tubular stem extension for lifting the float-valve from its seat, said means comprising a slide operating in the outlet-pipe, a swinging arm having connection with the slide, and means for rocking said arm.

5. The combination of a reservoir, a guide therein, a float-valve contained in the reservoir and operating in the guide, a supply-pipe, walls forming a chamber at the base of the reservoir into which chamber the float-valve projects, an outlet-pipe, the supply and outlet pipes communicating with the chamber, the float-valve controlling the communication of the outlet-pipe with said chamber, means for raising the float-valve from its seat, and means for withdrawing the air from the float-valve to permit the gradual return of the valve.

6. The combination of a reservoir, a guide therein, a float-valve contained in the reservoir and operating in the guide, a supply-pipe, walls forming a chamber at the base of the reservoir into which chamber the float-valve projects, an outlet-pipe, the supply and outlet pipes communicating with the chamber, the float-valve controlling the communication of the outlet-pipe with said chamber, means for raising the float-valve from its seat, means for withdrawing the air from the float-valve to permit the gradual return of the valve, and walls forming a by-pass passage extending from the upper part of the reservoir to the said outlet-pipe, the by-pass passage being also controlled by the float-valve.

7. The combination of a reservoir having a chamber at its lower end, a float-valve contained in the reservoir and projecting into the said chamber, a supply-pipe and an outlet-pipe communicating with said chamber, the said float-valve controlling the communication of the outlet-pipe with the chamber, means forming a passage leading from the upper part of the reservoir to said outlet-pipe, the said float-valve also controlling said passage, means for raising the float-valve from its seat, and means for gradually decreasing the buoyancy of the float-valve to permit the gradual descent of the valve to its seat.

8. The combination of a reservoir, a water-supply pipe leading to said reservoir, a water-outlet pipe communicating with the supply-pipe, a float-valve controlling said communication, means forming a passage establishing communication between the upper end of said reservoir and the outlet-pipe the said float-valve also controlling said communication, means for raising the float-valve from its seat and a tubular stem extending from the interior of the float-valve downward into the outlet-pipe and adapted to withdraw air from the float-valve.

9. The combination of a reservoir provided with an opening in its bottom, and having a chamber at its lower end communicating at its top with said opening, the said chamber having an opening in its bottom, an annular flange surrounding said opening and having its inner face tapered, a supply-pipe connected directly with said chamber at one side thereof, an outlet-pipe connected with the lower end of the reservoir and communicating with the opening in the bottom of said chamber, a float-valve located in said reservoir and adapted to extend through said chamber, the said float-valve having a tapered lower portion adapted to seat within the said flange, the said reservoir being provided with a passage leading from the upper part of the reservoir to the discharge-pipe, the said float-valve controlling the communication between the said chamber and the outlet-pipe, and also controlling the said passage, and means for raising the float-valve from its seat.

10. The combination of a reservoir, a water-supply pipe communicating therewith, the said water-supply pipe also communicating with a water-outlet pipe, a float-valve controlling said communications the said float-valve when lifted from its seat establishing communication directly between the supply-pipe and the outlet-pipe, and means for raising and lowering the said float-valve from and to its seat.

11. The combination of a reservoir, a water-supply pipe communicating therewith, the said water-supply pipe also communicating with the water-outlet pipe, the upper part of the reservoir also communicating with the water-outlet pipe by means of a by-pass passage, a float-valve controlling the said three communications, and means for raising and lowering the said float-valve from and to its seat.

12. The combination of a reservoir having a chamber at its base, a water-supply pipe leading to said chamber, a water-outlet pipe communicating with said chamber through an opening in the bottom of the chamber, the chamber having an opening in its top communicating with the reservoir, the upper part of the reservoir communicating with the water-outlet pipe, and means for controlling the said three communications.

In witness whereof I have signed my name to this specification in the presence of two subscribing witnesses.

WILLIAM S. WHITE.

Witnesses:
  WM. MORROW,
  FRANK HAWTHORNE.